Patented July 31, 1934

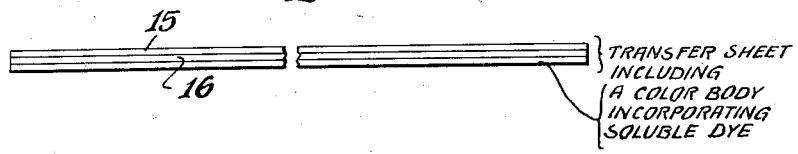
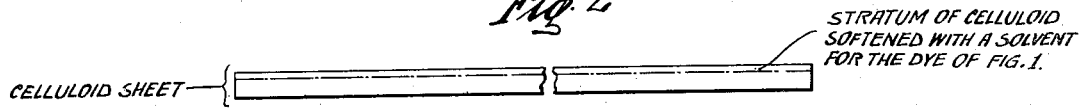
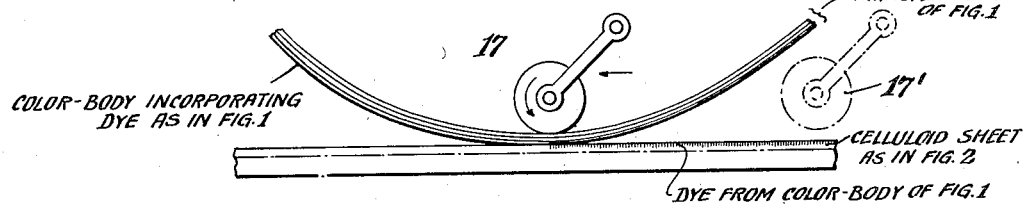
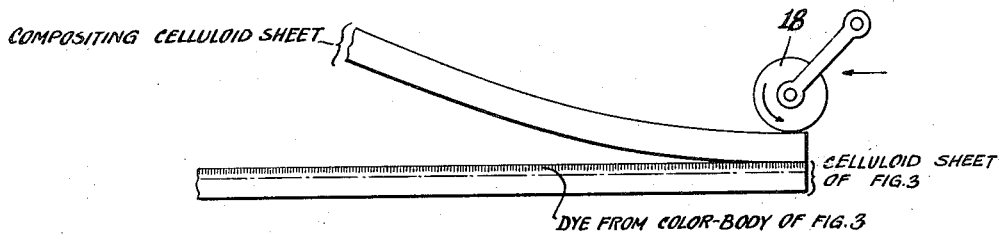
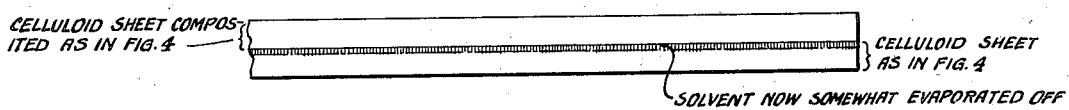
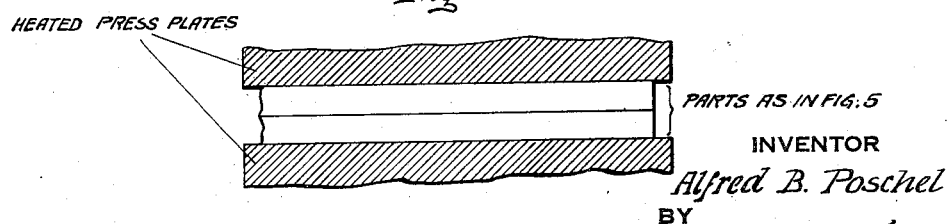

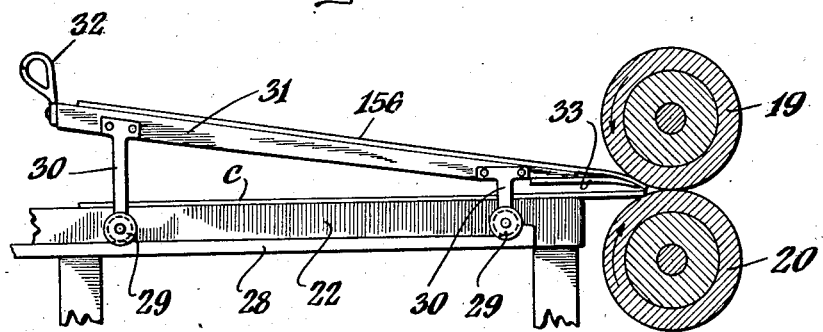
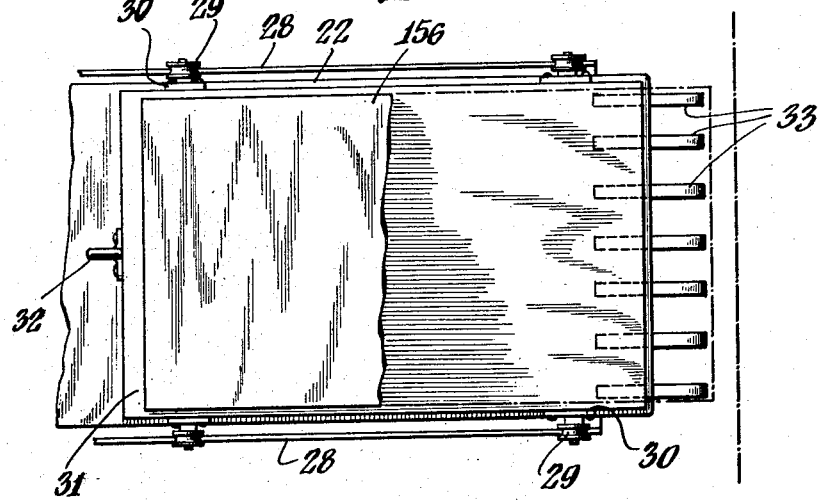
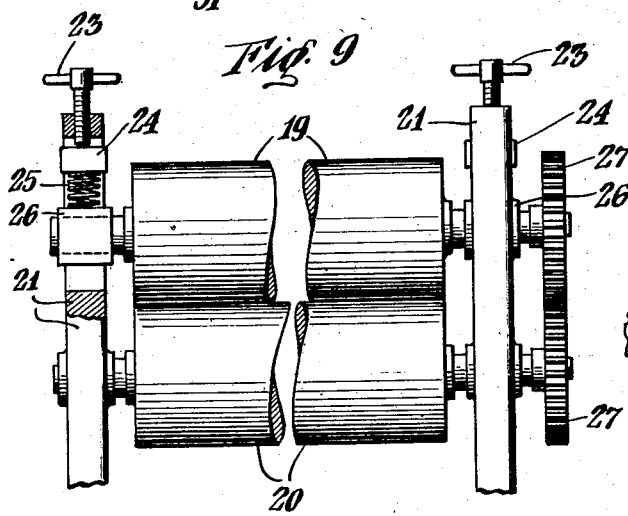
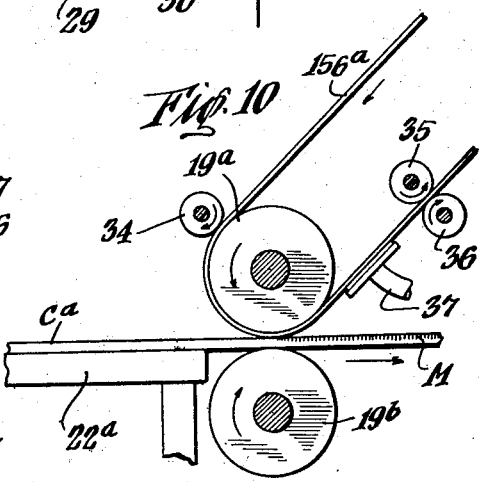

1,968,095

UNITED STATES PATENT OFFICE 1,968,095

COMPOSITING CELLULOSE ESTER SHEETS

Alfred B. Poschel, Brooklyn, N. Y., assignor to Decorative Development, Inc., Brooklyn, N. Y., a corporation of Delaware Application March 10, 1932, Serial No. 597,888

4 Claims. (Cl. 41—33)

This invention relates to the compositing of sheets of cellulose-ester such as of celluloid or cellulose acetate or like materials, known under numerous different trade-names such, for instances, as pyralin, fibroloid, cellon, etc. Such sheets will hereinafter, for convenience, be referred to as cellulose-ester sheets.

By composited cellulose-ester sheets is meant the article resulting from securing together, face to face, a plurality of cellulose-ester sheets such as celluloid, cellulose acetate or like materials sheets. Heretofore, various methods have been proposed for producing composited cellulose-ester sheets.

Sometimes one cellulose-ester sheet has been of one color or colors, and another of a different type of coloration, or transparent; the desired color or colors being incorporated in the cellulose-ester material before the latter is made up into sheets. This is ordinary compositing, and it will herein be referred to as such.

In other types of cellulose-ester sheet compositing as heretofore known, the coloring matter is embedded between the two sheets composited, as a more or less distinct layer therebeposited, that is, as a color-body spread from inks having pigments as coloring matter and applied over a face of one of the sheets after fabrication of the latter as such. These pigments are generally components of lithographic ink consisting largely of oil varnish as the pigment carrier or vehicle; and cellulose-ester sheet compositing wherein a color-body formed from such an ink is embedded between the cellulose-ester sheets will herein be referred to as pigment-ink compositing.

In ordinary compositing, the bond attainable between the composited cellulose-ester sheets is an actual integration of the cellulosic material of the different sheets, such that subsequently one sheet may not be stripped from the other. But, in ordinary compositing, obviously photomechanically reproduced and printed, designs are not possible.

In pigment-ink compositing, on the other hand, any variegated and fine-lined design is employable which may be printed or transferred on one of the sheets with a pigmented ink or inks. But when a second cellulose-ester sheet is placed over such ink layer and attempted to be composited to the sheet to which said ink layer was applied to produce the design, it is impossible to obtain such an actual integration of the cellulose-ester material of the two sheets that subsequently one sheet may not be stripped from the other. The pigmented design applied as above to the first cellulose-ester sheet, however softened or even made somewhat permeable by the compositing effort employed, nevertheless acts as a distinct layer or blanket insufficiently miscible with the cellulose-ester material contiguous thereto and softened incident to such compositing effort, to allow the softened cellulose-ester material of a sheet on one side of said blanket to integrate with the similar material on the other side thereof. Consequently, while on occasion the compositing effort may sufficiently bond together the two cellulose-ester sheets and the distinctly intervening color-body to hold these parts so secured that neither cellulose-ester sheet will split away from the other or from the color-body on subsequently repeatedly curving or ruffling the completed article out of the flat,—it is not possible, as first above stated, to obtain such an actual integration of the cellulose-ester material of the two sheets that one sheet may not be stripped from the other.

The broad object of the present invention is to provide a novel and valuable method for producing decorated and composited cellulose-ester sheets having decorative printed markings imbedded and being inseparably bonded together; whereby, the advantages of both the two types of compositing of cellulose-ester sheets above referred to will be obtained and the disadvantages of both avoided.

In carrying out the invention as above, I have found, further, that the aforesaid richness and depth of color is not marred by lack of uniformity, either from uneven distribution of the coloring matter across the face of the first celluloid sheet, or across the meeting faces of the composited sheets. Not only is this true with solid colors, but also with elaborate and fine-lined patterns, since there is no smudging of such lines.

The present invention will be clearly understood from the following description, when taken in connection with the accompanying drawings illustrating a preferred way of carrying out the invention.

In these drawings:—

Fig. 1 is an edge elevation of a transfer sheet carrying a color-body incorporating soluble dye;

Fig. 2 is an edge elevation of a first celluloid sheet, to which celluloid sheet coloring matter from said transfer sheet is transferred, following the softening of a surface stratum of said celluloid sheet by a solvent for said dye;

Fig. 3 shows such transfer being performed;

Fig. 4 shows a carrying out of a step in the method by which a preliminary compositing is performed, that is, by which a second celluloid sheet is caused to adhere somewhat to the first celluloid sheet, following said transfer;

Fig. 5 shows the parts after the completion of said preliminary compositing and after said solvent has been somewhat evaporated off;

Fig. 6 illustrates a final step, the application of heat and pressure to complete the compositing;

Fig. 7 is a side elevation of an apparatus for assisting to perform the step of Fig. 3;

Fig. 8 is a view, partially broken away, of the parts of Fig. 7, and with two rollers at the right removed, and with the sheet of celluloid (marked C in Fig. 7) omitted to simplify the drawings:

Fig. 9 is a front elevation, showing said rollers, and mounting, driving and adjustment means associated therewith; and Fig. 10 is a more or less diagrammatic side elevation view, showing a modified form of apparatus.

In all the views, and particularly in Figs. 1 to 6, the showings are more or less diagrammatic, especially as to exaggerations of thicknesses of various parts.

Referring first to Fig. 1, the transfer sheet shown includes a paper or suitable temporary carrier 15. This transfer sheet, as shown, also includes a support 16 which is permanently secured thereto, and to which the dye-incorporating color-body is applied.

The support 16 is of a special material like that disclosed and claimed in my co-pending application filed Aug. 29, 1931, Serial No. 560,245. When so made, the support 16 is a permanently resilient impermeable, non-water soluble, and non-alcohol soluble colloidal film or layer, which is inseparably bonded to the temporary carrier. As taught in said co-pending application, a useful formula for preparing the material to establish the support 16 as just described is: rubber latex, 40 parts; dry casein, 10 parts; zinc stearate, 5 parts; water, 50–100 parts; paraffin emulsion, 5 parts; formalin, 2 parts; and triethanolamine, 3 parts.

The color-body of Fig. 1 is preferably constituted of colloidal dyes and is preferably produced by printing. I recommend the use of a printing ink in connection with the establishment of said color-body which, for example, is made up of an oil or alcohol soluble dye, 30 parts, and a varnish vehicle therefor, 70 parts, with such varnish vehicle comprising chlorinated diphenyl (viscous resinous oil) 45 parts; coumarone resin (light colored) 15 parts; castor oil (blown) 25 parts, elemi resin 10 parts; and elemi oil 5 parts. If very fine grinding is effected the foregoing provides a non-fixed dye-ink even for lithographic printing; further a suitable type of printing ink particularly suitable for rotogravure printing is disclosed in my copending application #630,337.

Referring next to Fig. 2, the cellulose-ester sheet to which the color-body is to be transferred is treated to incorporate in the same a softened surface stratum as shown. This stratum is established by suitably applying a cellulose-ester solvent which is also a solvent for the soluble-dye material of the color-body; as by spraying such solvent on the upper surface of the sheet of Fig. 2. A satisfactory solvent for nitro-cellulose as well as for cellulose acetate sheets is acetone ethylene, glycol, mono-methyl ether, or ethyl lactate; desirably the latter, because not having a tendency to evaporate off too quickly. As preferable even to ethyl lactate, however, there is recommended for nitro-cellulose sheets a mixture of cyclohexanone (40 parts) and carbitol (60 parts); which mixture has very little action on nitro-cellulose sheets.

Referring next to Fig. 3, the color-body of the transfer sheet is applied to the surface stratum of thus softened celluloid material of the sheet of Fig. 2. This application is performed by comparatively light pressure, say just a few pounds, without the addition of heat. A squeegee roller such as shown at 17 may be employed, since a rolling pressure is recommended as probably the only practicable way of giving the even pressure desirable to be given to all parts of the transferred sheet when the same is applied to bring different portions thereof one after another successively against different portions of the surface of said stratum. According to the showing of Fig. 3, the roller 17 has traveled some distance from the initial location 17' thereof indicated in broken lines; and the portions of the transfer sheet which have transferred dye to the stratum of softened celluloid have been stripped away from such stratum as the roller has moved further and further toward the left away from location 17'.

The transfer sheet may or may not be thus stripped off progressively as the roller 17 progresses from right to left in Fig. 3. Such stripping off of the transfer sheet, where it is laid down completely before any part thereof is stripped off, is in most cases preferably performed, immediately after the sheet has been laid down in its entirety, or shortly thereafter, so that said sheet is stripped off before the celluloid softener has been considerably evaporated off, but due to the properties of the support 16 the stripping of the transfer sheets from the processed cellulose-ester sheets even after complete evaporation of the applied solvent, is possible because the rubber—casein,— formaldehyde composition does not form an inseparable bond with the cellulose-ester material.

Referring now to Fig. 4, a preliminary compositing with another cellulose-ester sheet is performed preferably by means of rolling pressure, without the addition of heat, a comparatively light pressure, say 15 to 20 lbs. is sufficient; such pressure coacts with the tackiness of surface of the processed cellulose-ester sheet to secure the second cellulose-ester sheet together sufficiently to insure against accidental relative shift during subsequent handling, yet with neither the pressure nor the tackiness great enough to cause distortion of the transferred color now interposed between the two cellulose-ester sheets.

In Fig. 4, a squeegee roller 18 is shown as having been applied to press an end portion of the second cellulose-ester sheet against the tacky upper surface of the first cellulose-ester sheet, incidental to the commencement of a travel of said roller to the left,—during which travel successive portions of the second cellulose-ester sheet will be pressed down one after another against the tacky upper surface of the first cellulose-ester sheet.

Referring next to Fig. 5, the same shows the preliminary compositing completed.

The transferred coloring matter is now embedded between the two cellulose-ester sheets, but without unevenness of shade if a solid color, and without smudging or other marring if a pattern however fine-lined. The preliminary composited sheets may now be handled more or less carelessly, provided that the composited article be not bent considerably out of the flat.

As the parts are shown in Fig. 5, the solvent or solvents which established the softened stratum of Fig. 2 have been allowed to evaporate somewhat, that is, the composited article has been allowed to undergo some seasoning, following the preliminary compositing of Fig. 4. This is recommended, although in some cases not essential. Usually such seasoning should be comparatively short, say several hours; that is, just long enough to avoid such an excess of retained solvent anywhere in the celluloid material as may possibly give rise to blistering when the article is finally composited by applying heat and relatively high pressure, as will now be described.

The final compositing is effected in any suitable way to subject a preliminarily composited article to heat, say 175 to 200° F., and, simultaneously, to relatively high pressure, say 450 to 500 lbs. per square inch. The most convenient method of effecting this final compositing is to compress the stack of cellulose-ester sheets assembled by the preliminary compositing in a hydraulic press having heated press plates, as shown in Fig. 6.

Referring next to Figs. 7, 8 and 9, an apparatus is shown which substitutes for the single roller of Fig. 3 or Fig. 4, a plurality of rollers and associated devices, and represents a practical form of apparatus which has successfully been employed in carrying out either of the steps diagrammatically illustrated in Figs. 3 and 4.

This apparatus includes a pair of rubber-faced rollers 19 and 20 journalled at their opposite ends in standards 21 suitably fixed in place in proper relation to one end of a table 22. The roller 19 is adjustable as to pressure against the roller 20, by hand screws 23 which may be turned to move blocks 24 downwardly. As shown to the left in Fig. 9, each block 24 has therebelow an expansile coil spring 25, with the lower end of such spring bearing on a slide block 26 within which an end of the roller 19 is journalled. The roller 19 may be set to exert the required pressure against the roller 20 while the two rollers are rotated as a means for drawing therethrough a plurality of sheets fed thereto. As shown to the right in Fig. 9, the roller shafts have fixed thereon intermeshing spur gears 27, and the shaft of roller 20 is extended beyond its gear to carry a pulley gear or the like (not shown) by which said shaft may be coupled to a motor or the like for power drive at the required speed.

The table top is at a level such that a sheet of celluloid, C, thrust edgewisely therealong toward the rollers 19 and 20, will enter between the two rollers and contact them both substantially in the horizontal plane which includes their line of contact.

Along opposite sides of the table are horizontal tracks 28 for grooved wheels 29 at the lower ends of four legs 30 which support a board 31 inclined as shown. This inclination of the board 31 is such that when the wheels 29 have traveled as far as possible to the right in Fig. 7, as there shown, a sheet material, laid on the top of the board, thrust downwardly along the same with the forward edge of such sheet aligned with the line of contact of the rollers 19 and 20, will enter at said edge between the two rollers to contact them both substantially in the horizontal plane which includes their line of contact.

Preferably, the rollers 19 and 20 are started rotating only after the celluloid sheet C on the top of table 22, and the sheet material on top of board 31, have had their forward edges inserted between the rollers as above described.

When the step of Fig. 3 is performed by the aid of the apparatus now being described, the sheet material laid on and moved downwardly along the top of board 31 is a suitable transfer sheet as indicated at 156. Such a sheet is ordinarily rather limp; yet the lower edge 31' of the board 31 should be somewhat separated from the rollers 19 and 20, as shown, when the board is moved, as by a handle 32, to extreme adjacency to such rollers. Such transfer sheet, is of course, placed on the board 31 with its color-body lowermost; so that while the transfer sheet and the celluloid sheet C are fed together through the rollers 19 and 20, said color-body will be squeezed against the cellulose-ester sheet, and against the softened surface stratum thereof, which stratum is uppermost when the cellulose-ester sheet C is placed on the table 22. Consequently, a difficulty might arise from the premature drooping of the leading portion of the transfer sheet fed beyond said edge 31', incidental to moving the transfer sheet downwardly over the board 31 in an attempt to have the rollers 19 and 20 seize the forward edge of such portion simultaneously with the seizure by said rollers of the forward edge of the celluloid sheet C at the same time extended therebetween as shown in Fig. 7. The difficulty arising from such drooping might be an out-of-registry, or a shifted, or a wrinkled, or other unintended and undesirable adhesion of the color-body of the transfer sheet to the sticky upper surface of the cellulose-ester sheet C. In order to overcome this difficulty a plurality of spaced forwardly extended fingers 33 are mounted on the underside of the board 31 to project therefrom as shown. These fingers are of thin spring metal or the like, stiff enough to sustain the weight of the forward portion of the transfer sheet projected beyond the lower edge 31' of the board 31, and yet flexible enough to give somewhat, as shown in Fig. 7, as soon as the rollers have seized and begun to feed forward the transfer and cellulose-ester sheets.

When the step of Fig. 4 is performed by the aid of the apparatus now being described, these fingers, while unnecessary, need not be removed, due to their yielding character as just referred to; as they will give if required to allow the second cellulose-ester sheet, moved down along the top of board 31, to properly join the first cellulose-ester sheet C advanced along the top of table 22, incident to the seizure and feeding forward of the two cellulose-ester sheets by the rollers 19 and 20.

By means of the handle 32, the board 31 may be caused to travel back and forth on its wheels 29, which is a convenience. For instance, in connection with the step of either Fig. 3 or Fig. 4, it will be helpful to move the board 31 to the left sufficiently to uncover a considerable length of the table 22 leading to the rollers 19 and 20. Then the cellulose-ester sheet C may be easily inserted at its forward edge properly between the rollers 19 and 20. Also, if the cellulose-ester sheet C is to be given its softened upper stratum while on the table 22, the solvent material applied to establish such stratum, particularly if such application be by spraying, may be easily thus applied.

Referring finally to Fig. 10, a form of apparatus is shown for facilitating the step of Fig. 3, wherein with a pair of rollers feeding therethrough a transfer sheet and a celluloid sheet, the transfer sheet is cleared away from the celluloid sheet following successive transfers of color to successive portions of the celluloid sheet. Said rollers are indicated at 19a and 19b. The cellulose-ester sheet Ca, having a softened upper stratum as already mentioned, is supported on a table 22a and drawn along the same by the action of the rollers; there being simultaneously fed through the rollers said cellulose-ester sheet and the transfer sheet 156a. This transfer sheet, however, is suitably guided, as by small rollers 34, 35 and 36 and a guide plate 37, to pass around the upper roller 19a in approaching the cellulose-ester sheet Ca and in leaving the latter after transfer of coloring matter as indicated at M. It might be convenient in such a practice of the invention, to provide a transfer sheet 156a as a web of considerable length, and also to provide the cellulose-ester sheet Ca as a sheet of considerable length. However, sheets of cellulose-ester of reduced lengths may be fed along the top of table 22a and between the rollers 19a and 20a, one behind the other, either directly or at spaced intervals as desired or convenient. Nor need the transfer sheet be in long web form. For instance, a transfer sheet of the usual or any convenient length may be fed through the apparatus around the roller 19a, or a plurality of such sheets may be thus fed, one after another. In this latter connection, it will be helpful to feed a follower transfer sheet behind a previously fed transfer sheet, by inserting the forward end of the follower sheet between the trailing end of the previously fed sheet and the roller 19a; and then the trailing end of the last mentioned sheet will rest on the guide plate 37 while interposing the leading end of the follower sheet between the trailing end of the previously fed sheet and the roller 19a, and so the follower sheet will always be guided on for travel over said plate and hence between the rollers 35 and 36.

Where the soluble-dye coloring matter is to be laid down by printing or coating or otherwise directly, that is, without first spreading such matter as a color-body element of a transfer sheet, the step of Fig. 3 may be performed, so far as laying said matter down on and into a softened surface stratum of a cellulose-ester sheet, by any means for carrying out this step of the invention, for instance, by the use of a rubber or other suitable printing roller.

While the way of carrying out the invention as hereinabove described in connection with the accompanying drawings is, as aforesaid, preferred, it is to be understood that the invention may be successfully practiced in various other ways.

For example, it will generally be found a matter of economy and convenience to apply the second or composited cellulose-ester sheet to the first cellulose-ester sheet without deferring this application so long after the addition of the soluble-dye coloring matter to the first sheet, that the latter is not still tacky from retention of the solvent which facilitated said addition. However, after the addition of the coloring matter to the first sheet, the second sheet may be applied at such a later time that all the solvent employed to facilitate said addition has evaporated off. In such a case, the first sheet, or the second sheet, or both these sheets, may have a solvent applied or added thereto in special preparation for applying the second or composited sheet.

Again, merely such rolling pressure as that which has been described in connection with Fig. 3 will suffice to attain final compositing, if sufficient solvent is present or the solvent is relatively active, at the time of applying said pressure. In such case, it will be found, after the solvent has all evaporated off, that the sheets are composited by being integrated according to the invention.

Further, if a step such as that which has been described in connection with Fig. 6 is employed, pressure alone will suffice, such pressure, for instance, as may be applied by a pair of rolls under suitable compression, (that is, heat as well as pressure need not be used), if sufficient solvent is present or the solvent is relatively active. If heat is used, best results are apparently obtained when the evaporation of solvent referred to by one of the legends of Fig. 5 has so far proceeded that, although the sheet or sheets previously treated with solvent in preparation of the step in Fig. 6 are no longer perceptibly tacky, yet it or they are potentially so. That is, a sheet surface to be applied to the other sheet surface is not tacky to the touch, yet there is some solvent still unevaporated from the celluloid material below the sheet surface touched.

Again, if a step such as that which has been above described in connection with Fig. 6 is employed, that is, with or without heat, it is desirable to employ, as an intermediate step, such a rolling pressure as that which has been above described in connection with Fig. 3, in order to bring about a preliminary adherence between the two sheets; this not only to avoid blistering or bubbles, but also to insure against premature contact of the sheets in non-registry.

There has heretofore been provided, so far as I am aware, no practical method of applying printed or other markings to a cellulose-ester sheet previously formed as such, which does not involve the disadvantage of poor compositing. The present invention not only provides such a method, but a method, further, which permits the employment, for such markings, of multicolor and minutely detailed designs, even fine-screen half-tone printings.

The scope of protection contemplated is to be taken solely from the appended claims, interpreted as broadly as is consistent with the prior art.

What is claimed is:

1. The method of producing a sheet structure including two composited cellulose-ester sheets between which is embedded a previously printed and transferred design, and in which structure said design is thus embedded as a smudgeless replica of the design as previously printed, yet wherein said sheets are actually coalesced so as to be truly integrated one with another even at said design; which method involves treating a carrier sheet for the reception of a transfer printing to provide a support on said sheet which is impermeable by dye-color ink, by the employment of such dye-color ink printing the design directly on said support, softening a surface stratum of one of the sheets first-mentioned by a solvent therefor which is also a solvent for said ink, applying said transfer printing directly against said softened stratum to cause imbibition of said design by said stratum while said design is on said support and then removing said carrier sheet and support, and while said stratum is thus softened laying the other of the sheets first-mentioned against said stratum and applying a preliminary pressure to obtain a preliminary coherence of the two sheets first-mentioned and while said sheets are thus cohered subjecting them to heat and pressure to integrate them as aforesaid.

2. The method defined in claim 1, wherein said support is a non-water-soluble and non-alcohol-soluble colloidal coating on said carrier.

3. The method defined in claim 1, wherein said carrier is a paper sheet and to provide said support said sheet is coated with a composition including rubber latex and dry casein.

4. The method defined in claim 1, wherein said carrier is a paper sheet and to provide said support said sheet is coated with a composition made up, approximately, of rubber latex 40 parts, dry casein 10 parts, zinc stearate 5 parts, water 50 to 100 parts, paraffin emulsion 5 parts, formalin 2 parts and triethanolamine 3 parts.

ALFRED B. POSCHEL.